United States Patent
Densel (10) Patent No.: US 7,677,607 B2
(45) Date of Patent: Mar. 16, 2010

(54) ADJUSTABLE FLUID COUPLING ASSEMBLY

(75) Inventor: David Scott Densel, Waterville, OH (US)

(73) Assignee: Eaton Corporation, Cleveland, OH (US)

( * ) Notice: Subject to any disclaimer, the term of this patent is extended or adjusted under 35 U.S.C. 154(b) by 51 days.

(21) Appl. No.: 11/860,393

(22) Filed: Sep. 24, 2007

(65) Prior Publication Data

US 2008/0073910 A1   Mar. 27, 2008

Related U.S. Application Data

(60) Provisional application No. 60/826,669, filed on Sep. 22, 2006.

(51) Int. Cl.
*F16L 27/12* (2006.01)

(52) U.S. Cl. .................... 285/298; 285/145.1; 285/181; 285/148.19

(58) Field of Classification Search ............ 285/38, 285/145.1, 298, 302, 181, 179, 390, 148.19, 285/90, 92
See application file for complete search history.

(56) References Cited

U.S. PATENT DOCUMENTS

| | | | | |
|---|---|---|---|---|
| 18,006 A | * | 8/1857 | Allen | 285/90 |
| 66,820 A | * | 7/1867 | Fitts | 285/355 |
| 327,877 A | * | 10/1885 | Hodges | 285/184 |
| 453,555 A | * | 6/1891 | Folly | 285/90 |
| 919,940 A | * | 4/1909 | Paiste | 285/90 |
| 938,984 A | * | 11/1909 | Curry | 285/232 |
| 1,570,155 A | * | 1/1926 | Karbowski | 285/90 |
| 2,746,773 A | * | 5/1956 | Bily | 285/117 |
| 2,906,152 A | * | 9/1959 | Brase | 285/148.19 |
| 3,209,786 A | * | 10/1965 | Daniels | 138/43 |
| 3,356,391 A | * | 12/1967 | Bailey | 285/89 |
| 4,145,076 A | * | 3/1979 | Snow | 285/94 |
| 4,708,038 A | * | 11/1987 | Hellnick et al. | 82/1.11 |
| 4,998,756 A | * | 3/1991 | Hart | 285/298 |
| 5,248,850 A | * | 9/1993 | Laney | 174/669 |
| 5,474,334 A | * | 12/1995 | Eppink | 285/184 |
| 6,059,321 A | * | 5/2000 | Lyall, III | 285/24 |
| 6,070,912 A | * | 6/2000 | Latham | 285/61 |
| 6,578,876 B2 | * | 6/2003 | Guertin, Jr. | 285/148.19 |
| 7,111,873 B1 | * | 9/2006 | Coogle | 285/302 |

FOREIGN PATENT DOCUMENTS

GB   2242247 A  *  9/1991

\* cited by examiner

*Primary Examiner*—David E Bochna
(74) *Attorney, Agent, or Firm*—Benesch, Friedlander, Coplan & Aronoff LLP (57) ABSTRACT

A coupling assembly including a union member having a first receiving portion with internal threads and a second receiving portion with oppositely oriented internal threads, a first coupling member (e.g., a hose adapter) having external threads that are threadingly engaged to the internal threads of the union member, and a second coupling member (e.g., an elbow fitting) having external threads that are threadingly engaged to the oppositely oriented internal threads of the union member. Upon rotation of the union member, the length and/or phase angle between the first and second coupling members changes.

18 Claims, 8 Drawing Sheets

ADJUSTABLE FLUID COUPLING ASSEMBLY

CROSS-REFERENCE TO RELATED APPLICATION

This application claims priority to U.S. Provisional Patent Application No. 60/826,669 filed on Sep. 22, 2006, the disclosure of which is hereby incorporated by reference in its entirety herein.

BACKGROUND

1. Field of the Invention

The present application relates to a fluid coupling assembly and, more particularly, to a fluid coupling assembly that permits length and angular adjustment.

2. Description of the Related Art

Typically, fitting designs are rigid and lack adjustability at the point of assembly to accommodate any component misalignment or length issues. Due to this lack of adjustability, certain fittings or combination of fittings are avoided by designers because of inherent tolerance and stack-up issues. For example, double elbow hose assemblies are often avoided because they require a fixed angle between the two end fittings. In cases where the double elbow hose assembly is forced to fit the application even though it is not adjustable, the hose life is typically reduced due to induced torsion on the hose.

SUMMARY

A coupling assembly including a union member having a first receiving portion with internal left-handed threads and a second receiving portion with internal right-handed threads, a first coupling member having external left-handed threads that are threadingly engaged to the internal left-handed threads of the union member, a second coupling member having external right-handed threads that are threadingly engaged to the internal right-handed threads of the union member and at least two annular seals, one of which is provided between the union member and the first coupling member and the other provided between the union member and the second coupling member. Upon rotation of the union member, the length between the first and second coupling members changes.

A coupling assembly including an adjustable fitting having a first receiving portion provided with a first set of internal threads and a second receiving portion provided with a second set of internal threads, where the second set of internal threads are oriented in an opposite direction than the first set of internal threads. The coupling assembly also includes an elbow fitting including a leading portion having external threads that are threadingly engaged to the first set of external threads of the adjustable fitting and a hose adapter including a leading portion having external threads that are threadingly engaged to the second set of external threads of the adjustable fitting. Upon rotation of the adjustable fitting, the length and/or phase angle between the elbow fitting and the hose adapter changes.

A coupling assembly including an adjustable fitting having a first receiving portion provided with a first set of internal threads and a second receiving portion provided with a second set of internal threads, where the first set of internal threads being oriented in an opposite direction as the second set of internal threads. The coupling assembly also includes a first coupling member having a leading portion with external threads threadingly engaged to the first set of internal threads of the adjustable fitting and a second coupling member including a receiving portion sized to receive at least a portion of the first coupling member. The second coupling member has external threads threadingly engaged to the second set of internal threads of the adjustable fitting. An annular seal is also provided between the first and second coupling members when the first coupling member is fully inserted into the second coupling member Upon rotation of the adjustable fitting, the length between the first and second coupling members changes.

BRIEF DESCRIPTION OF THE DRAWINGS

It will be appreciated that the illustrated boundaries of elements in the drawings represent one example of the boundaries. One of ordinary skill in the art will appreciate that a single element may be designed as multiple elements or that multiple elements may be designed as a single element. An element shown as an internal feature may be implemented as an external feature and vice versa.

Further, in the accompanying drawings and description that follow, like parts are indicated throughout the drawings and description with the same reference numerals, respectively. The figures may not be drawn to scale and the proportions of certain parts have been exaggerated for convenience of illustration.

DETAILED DESCRIPTION

Certain terminology will be used in the foregoing description for convenience in reference only and will not be limiting. The terms "forward" and "rearward" with respect to each component of the coupling assembly will refer to direction towards and away from, respectively, the coupling direction. The terms "rightward" and "leftward" will refer to directions in the drawings in connection with which the terminology is used. The terms "inwardly" and "outwardly" will refer to directions toward and away from, respectively, the geometric centerline of the coupling assembly. The terms "upward" and "downward" will refer to directions as taken in the drawings in connection with which the terminology is used. All foregoing terms mentioned above include the normal derivative and equivalents thereof.

The present application is directed to a coupling assembly that includes two coupling members and an adjustable fitting for coupling the two coupling members together. The adjustable fitting is configured to permit adjustment of the rotation angle (i.e., the phase angle) and the length between the two coupling members.

Figure 1A:
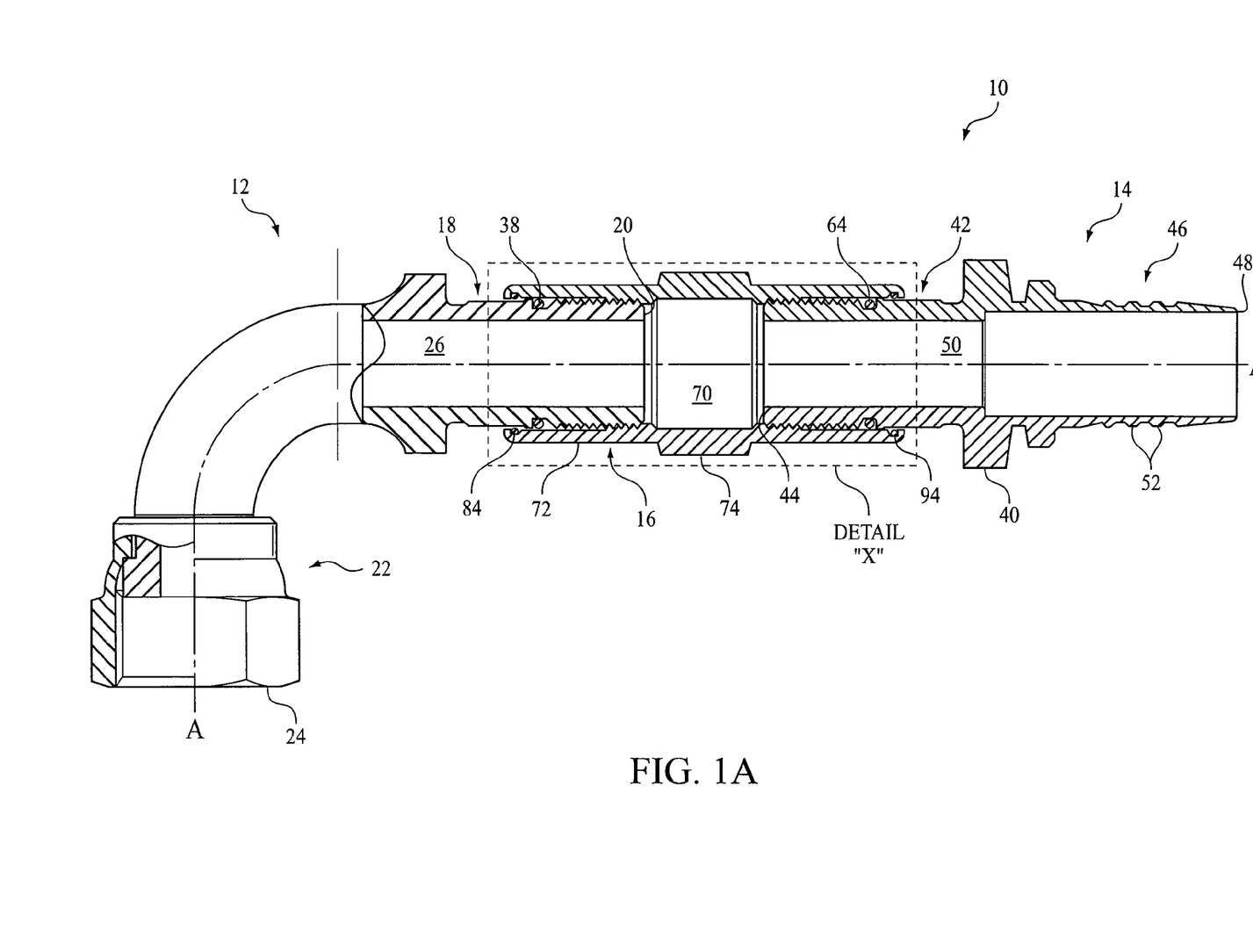
FIG. 1A illustrates a top plan view, partly cut-away, of one embodiment of an adjustable coupling assembly 10 in its coupled position.
Figure 1B:
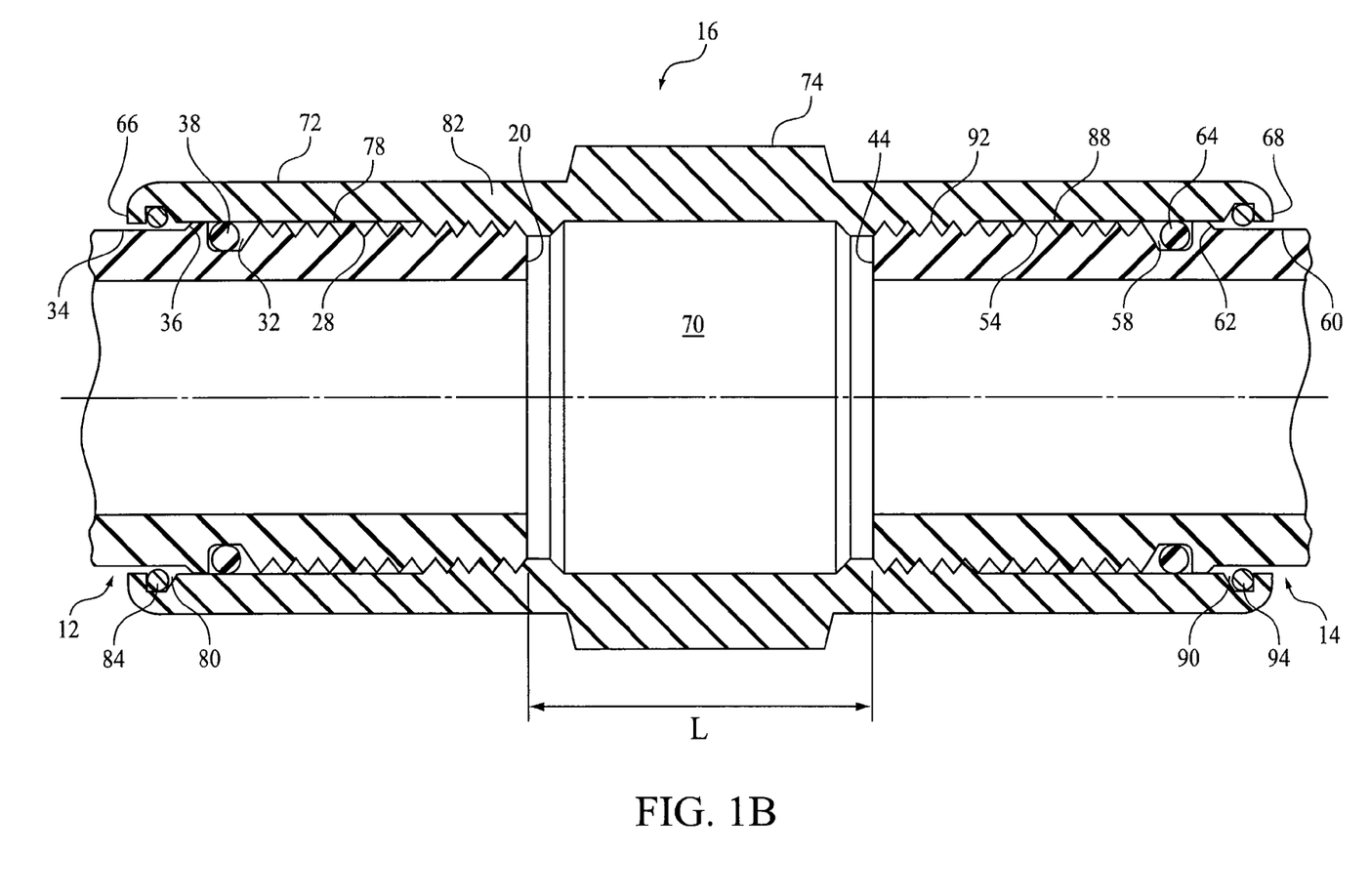
FIG. 1B illustrates a detailed view of Detail X from FIG. 1A.

Illustrated in FIGS. 1A and 1B are partly cut-away, top plan and detail views, respectively, of one embodiment of an adjustable coupling assembly 10 shown in its coupled position. The adjustable coupling assembly 10 includes a first coupling member 12, a second coupling member 14, and an adjustable fitting 16 that couples the first and second coupling members 12, 14 together. The first and second coupling members 12, 14 generally function as "male" components in the adjustable coupling assembly 10 and the adjustable fitting 16 generally functions as a female/female union in the adjustable coupling assembly 10, such that the adjustable fitting 16 is configured to receive both the first and second coupling members 12, 14. Both the first and second coupling members 12, 14 and the adjustable fitting 16 share the same central longitudinal axis A when they are in the coupled position as shown in FIG. 1. In one embodiment, the first and second coupling members 12, 14 and the adjustable fitting 16 can be formed of stainless steel. In alternative embodiments, the first and second coupling members 12, 14 and the adjustable fitting 16 can be formed of other materials, such as brass, aluminum, carbon, steel, and plastic.

In the illustrated embodiment, the first coupling member 12 is an elbow fitting that includes a leading portion 18 having a leading end 20 and a remote portion 22 having a remote end 24. Extending through the first coupling member 12 between the leading end 20 and the remote end 24 is a passageway 26 that permits fluid to flow therethrough. As shown in FIG. 1A, the remote portion 22 includes a threaded nut for attachment to external threads of a separate component (not shown). In an alternative embodiment (not shown), the first coupling member 12 can include other suitable connection means for attachment to a separate component (not shown).

Figure 1C:
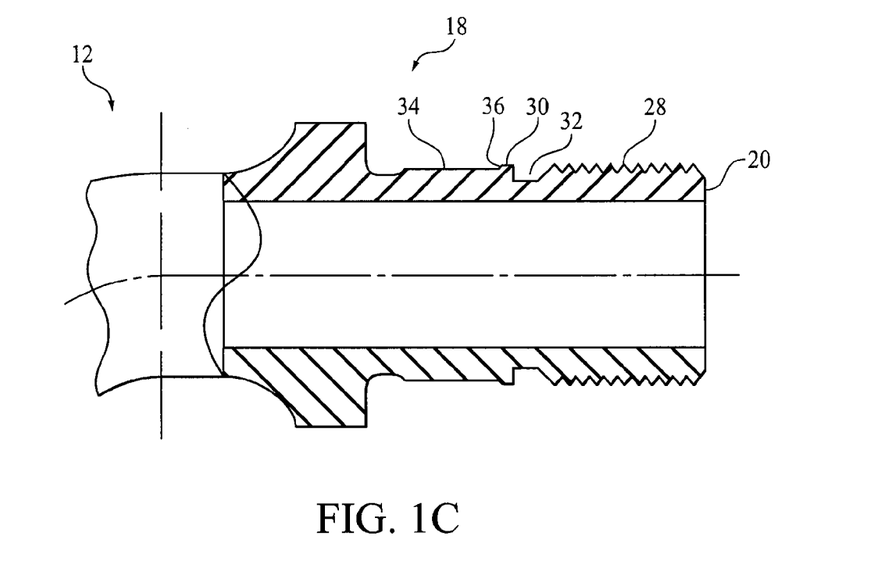
FIG. 1C illustrates a cross-sectional view of the leading portion 18 of the first coupling member 12 of the adjustable coupling assembly 10.

Illustrated in FIG. 1C is a cross-sectional view of the leading portion 18 of the first coupling member 12. As shown in FIG. 1C, the leading portion 18 of the first coupling member 12 includes a set of external threads 28 (e.g., right-handed threads) that extend rearward from the leading end 20 and a first exterior cylindrical surface 30 that is separated from the set of external threads 28 by an outwardly facing annular groove 32. The leading portion 18 also includes a second exterior cylindrical surface 34 that is separated from the first exterior surface 30 by a shoulder 36. The shoulder 36 serves to limit axial travel of the first coupling member 12 in a direction away from the second coupling member 14 (see FIG. 1B), which will described in further detail below.

With reference back to FIG. 1B, positioned within the groove 32 is an annular seal 38 constructed of neoprene or other suitable sealing material. The annular seal 38 is sized to extend slightly past the outer extremities of the external threads 28. In another embodiment (not shown), a support ring constructed of rigid plastic, leather, or hard rubber can be positioned in the groove 32. In this embodiment, the support ring would serve to protect the annular seal 38 from damage when the adjustable coupling assembly 10 is used in high-pressure applications (see FIG. 1A). In another embodiment (not shown), the annular seal and/or the support ring may be received in a groove in the adjustable fitting 16.

With reference back to FIG. 1A, the second coupling member 14 is a hose adapter that includes a collar 40, which separates a leading portion 42 having a leading end 44 and a trailing portion 46 having a trailing end 48. Extending through the second coupling member 14 from the leading end 44 to the trailing end 48 is a passageway 50 that permits fluid to flow therethrough. As shown in FIG. 1A, the trailing portion 46 of the second coupling member 14 is provided with a series of barbs 52 for connecting to a flexible conduit or hose (not shown). In an alternative embodiment (not shown), the trailing portion 46 may be provided with external threads for attachment to a threaded coupling of another component. In other embodiments (not shown), the second coupling member can be an elbow fitting or another type of fitting.

Figure 1D:
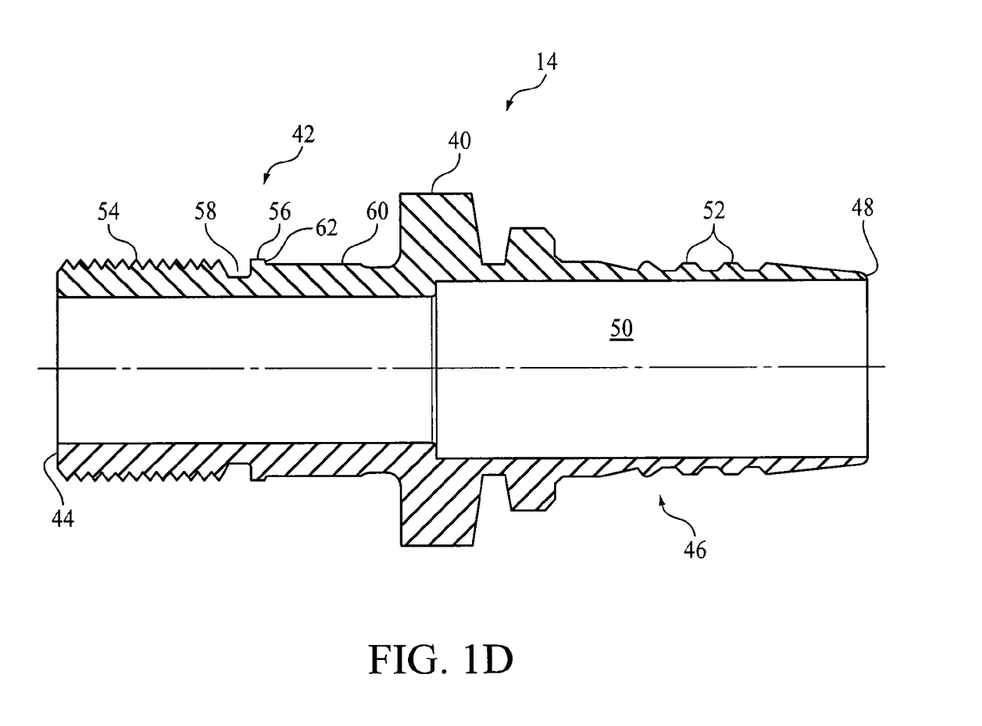
FIG. 1D illustrates a cross-sectional view of the leading portion 42 of the second coupling member 14 of the adjustable coupling assembly 10.

Illustrated in FIG. 1D is a cross-sectional view of the leading portion 42 of the second coupling member 14. As shown in FIG. 1D, the leading portion 42 of the second coupling member 14 includes a set of external threads 54 adjacent to the leading end 44 and a first exterior cylindrical surface 56 that is separated from the external threads 54 by an outwardly facing annular groove 58. The external threads 54 are oriented in the opposite direction (e.g., left-handed threads) of the external threads 28 of the first coupling member 12. The leading portion 42 also includes a second exterior cylindrical surface 60 that is separated from the first exterior surface 56 by a shoulder 62. The shoulder 62 serves to limit axial travel of the second coupling member 14 in a direction away from the first coupling member 12 (see FIG. 1B), which will described in further detail below. In an alternative embodiment, the second coupling member 14 can include a set of external right-handed threads, so long as the first coupling member 12 includes left-handed threads.

With reference back to FIG. 1B, positioned within the groove 58 is an annular seal 64 constructed of neoprene or other suitable sealing material. The annular seal 64 is sized to extend slightly past the outer extremities of the external threads 54. In another embodiment (not shown), a support ring constructed of rigid plastic, leather, or hard rubber may be positioned in the groove 58. The support ring would serve to protect the annular seal 64 from damage when the adjustable coupling assembly 10 is used in high-pressure applications. In another alternative embodiment (not shown), the annular seal and/or the support ring may be received in a groove in the adjustable fitting 16.

Figure 1E:
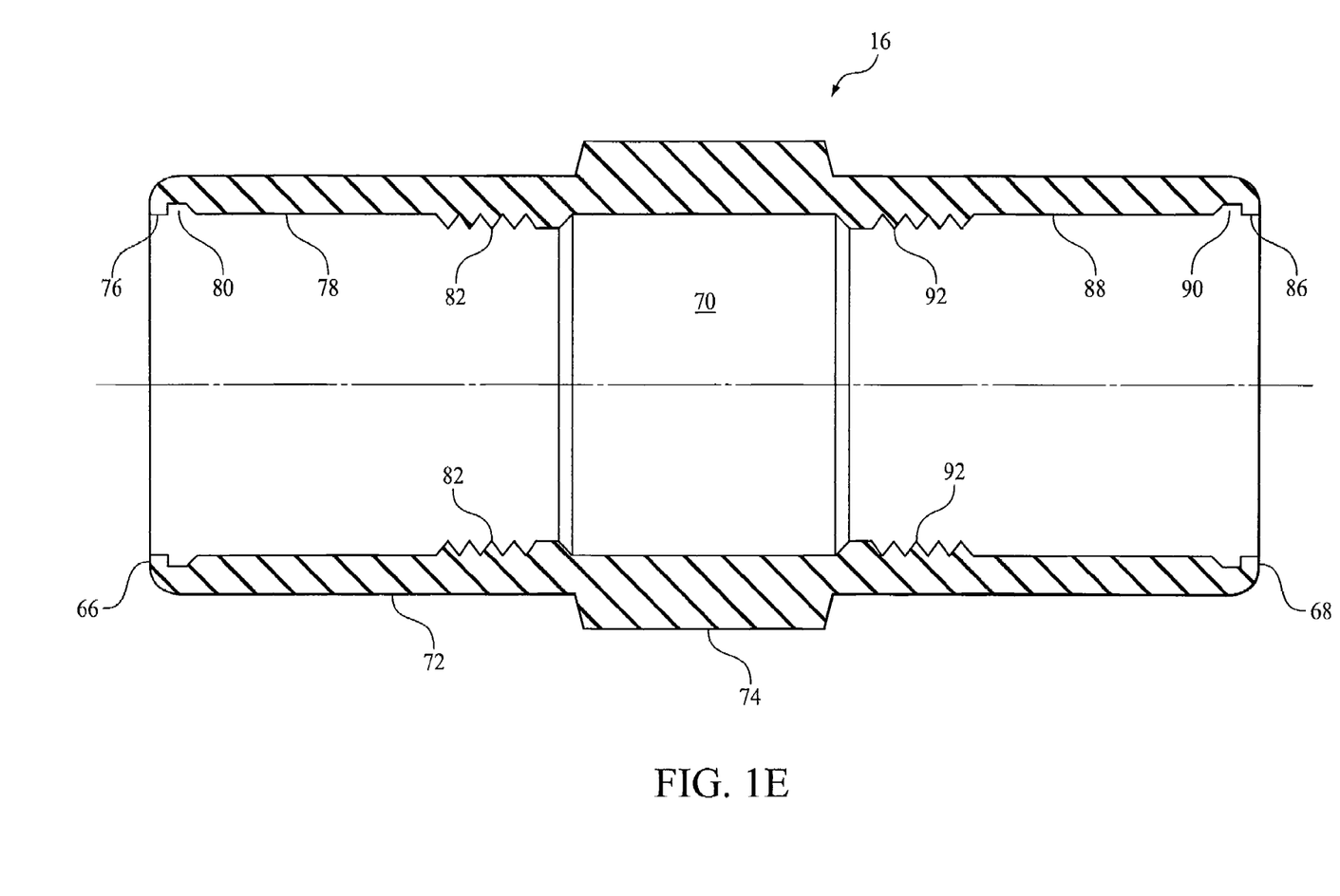
FIG. 1E illustrates a cross-sectional view of the adjustable fitting 16 of the adjustable coupling assembly 10.

Illustrated in FIG. 1E is a cross-sectional view of the adjustable fitting 16. As shown in FIG. 1E, the adjustable fitting 16 includes a first receiving portion having a first receiving end 66 that extends to a second receiving portion having a second receiving end 68 defining a passageway 70 therebetween. The adjustable fitting 16 also includes an exterior cylindrical surface 72 and centrally located flats 74 configured to be engaged by a tool, such as a wrench.

In the illustrated embodiment, the adjustable fitting 16 further includes a first interior cylindrical surface 76 extending from the first receiving end 66 and a second interior cylindrical surface 78 that is separated by from the first interior surface 76 by a first inwardly facing annular groove 80. The second interior surface 78 is sized to sealingly receive and engage the annular seal 38 on the first coupling member 12. Adjacent to the second interior surface 78 is a set of internal threads 82 (e.g., right-handed threads) configured to engage the external threads 28 of the first coupling member 12. When coupled together, the first coupling member 12 and the adjustable fitting 16 can be moved, both rotationally and axially, relative to each other due to the threaded relationship between them.

Figure 1F:
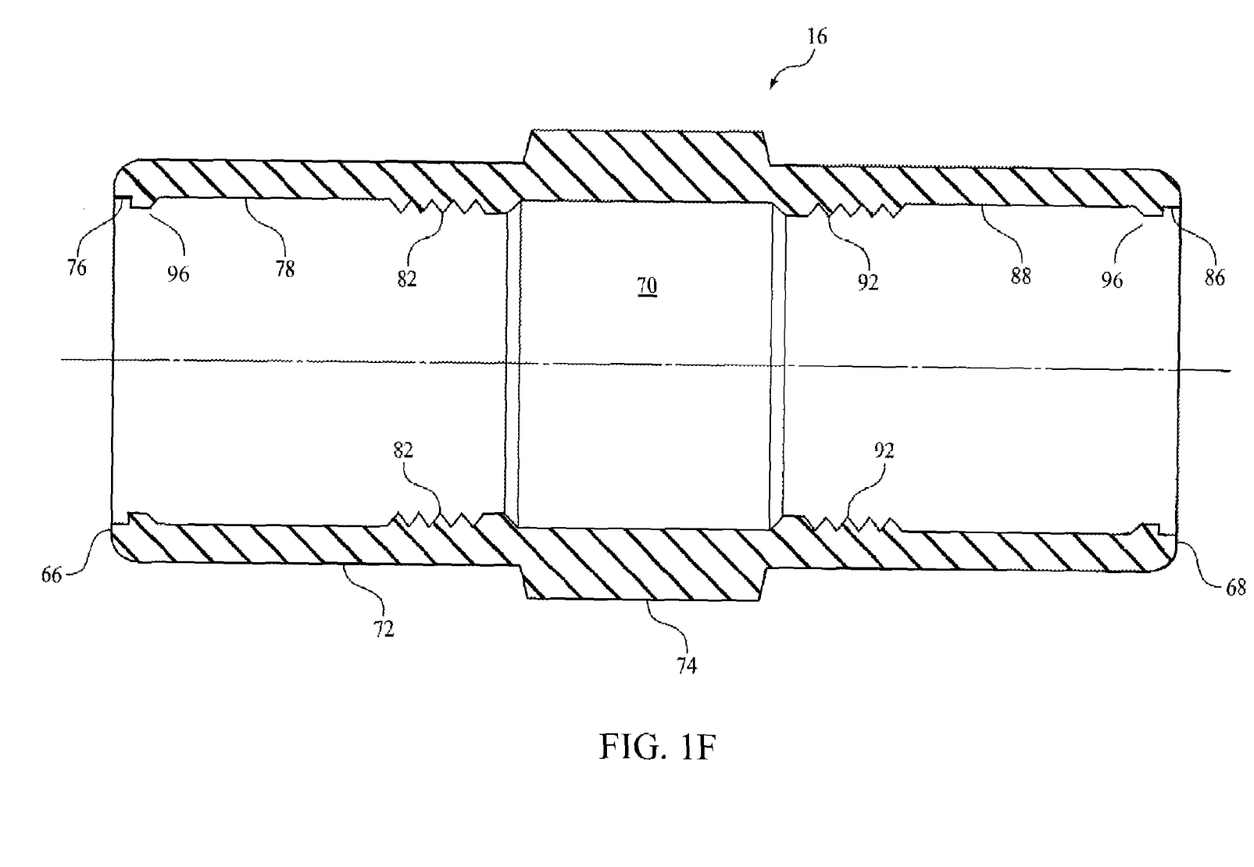
FIG. 1F illustrates a cross-sectional view of an alternative embodiment of an adjustable fitting of an adjustable coupling assembly.
Figure 1G:
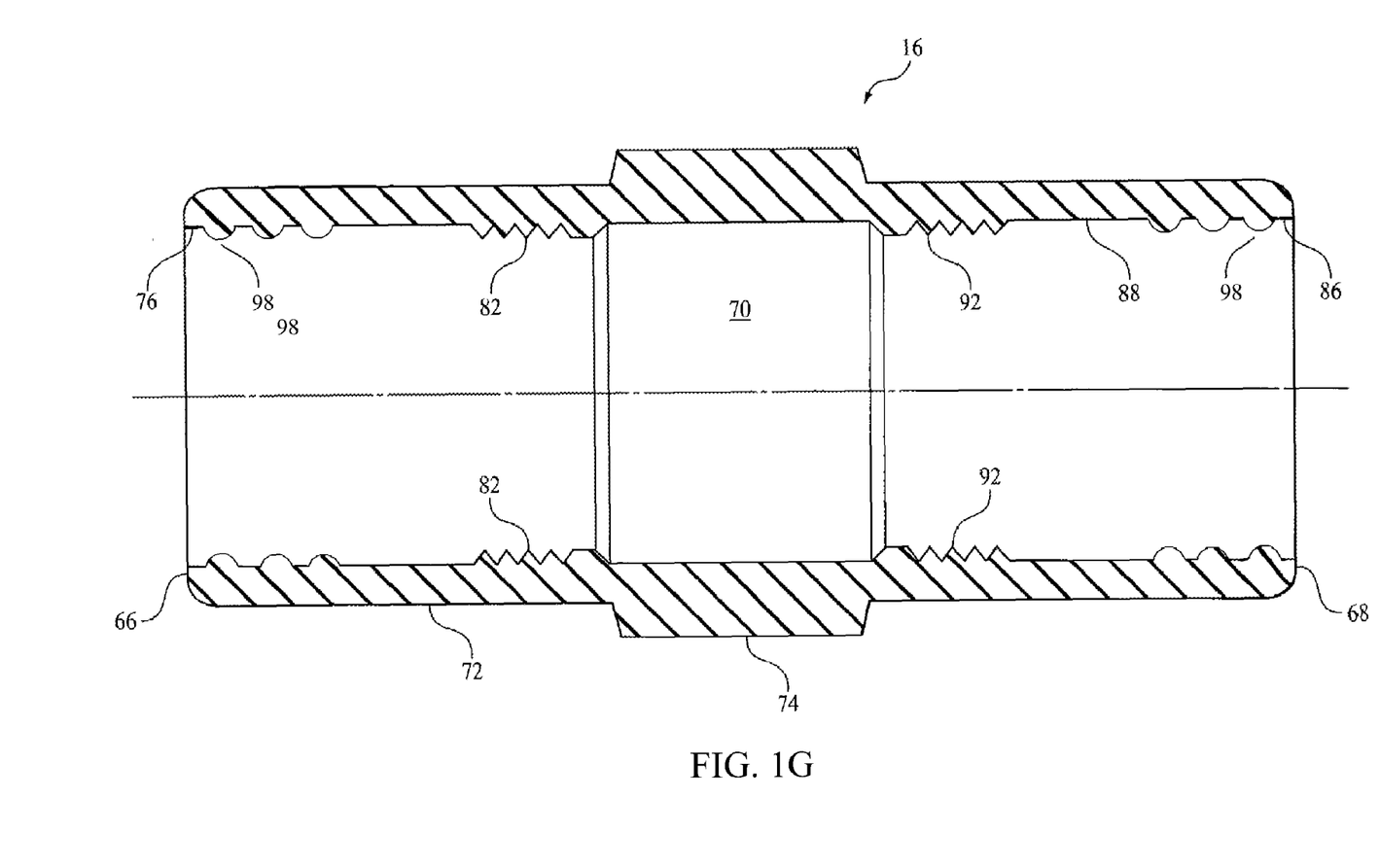
FIG. 1G illustrates a cross-sectional view of another alternative embodiment of an adjustable fitting of an adjustable coupling assembly.

With reference back to FIG. 1B, the adjustable coupling assembly 10 further includes a first retaining element, such as a split, retaining ring 84, that is seated in the first groove 80 and sized to provide a slight gap between its inner diameter and the second exterior surface 34 of the first coupling member 12. The first retaining ring 84 serves to limit axial travel of the first coupling member 12 in a direction away from the second coupling member 14, as it will interfere with the shoulder 36 of the first coupling member 12. In alternative embodiments (shown in FIGS. 1F and 1G), the first retaining element (i.e., the first retaining ring 84 and, thus, the first groove 80) can be replaced with a radially inward protruding rib 96 (as shown in FIG. 1F) or bumps 98 (as shown in FIG. 1G) extending from the first or second interior surfaces 76, 80 of the adjustable fitting 16, where the rib 96 or bumps 98 serves to limit axial travel of the first coupling member 12 in a direction away from the second coupling member 14. The radially inward protruding rib 94 or bumps 98 can be formed at the time of manufacture of the adjustable fitting 16 or can be formed via a secondary forming operation (e.g., crimping, swaging, or staking) after assembly of the components.

With reference back to FIG. 1E, the adjustable fitting 16 includes a third interior cylindrical surface 86 extending from the second receiving end 78 and a fourth interior cylindrical surface 88 separated from the third interior surface 86 by an inwardly facing annular groove 90. The fourth interior surface 88 is sized to sealingly receive and engage the annular seal 64 on the first coupling member 12. Adjacent to the fourth interior surface 88 is a set of internal threads 92 that are configured to engage the external threads 58 of the second coupling member 14. The internal threads 92 are oriented in the opposite direction (e.g., left-handed threads) of the internal threads 82. When coupled together, the second coupling member 14 and the adjustable fitting 16 can be moved, both rotationally and axially, relative to each other due to the threaded relationship between them.

With reference back to FIG. 1B, the adjustable coupling assembly 10 further includes a second retaining element, such as a split, retaining ring 94, that is seated in the second groove 90 and sized to provide a slight gap between its inner diameter and the second exterior surface 60 of the second coupling member 14. The second retaining ring 94 serves to limit axial travel of the second coupling member 14 in a direction away from the first coupling member 12, as it will interfere with the shoulder 62 of the second coupling member 14. In alternative embodiments (shown in FIGS. 1F and 1G), the second retaining element (i.e., the second retaining ring 94 and, thus, the second groove 90) can be replaced with a radially inward protruding rib 96 or series of bumps 98 extending from the first or second interior surfaces 86, 88 of the adjustable fitting 16, where the rib 96 or bumps 98 serve to limit axial travel of the second coupling member 14 in a direction away from the first coupling member 12. The radially inward protruding rib 96 or bumps 98 can be formed at the time of manufacture of the adjustable fitting 16 or can be formed via a secondary forming operation (e.g., crimping, swaging, or staking) after assembly of the components.

Due to the fact that the adjustable fitting 16 includes internal threads 82 that threadingly engage the external threads 28 of the first coupling member 12 and internal threads 92 (oriented in the opposite direction of the internal threads 82) that threadingly engage the external threads 54 of the second coupling member 14, the adjustable fitting 16 is capable of adjusting the axial length L between the first and second coupling members 12, 14. For example, when the adjustable fitting 16 is rotated in one rotational direction (e.g., clockwise), the axial length L between the first and second coupling members 12, 14 can be increased. On the other hand, when the adjustable fitting 16 is rotated in the other rotational direction (e.g., counter-clockwise), the axial length L between the first and second coupling members 12, 14 can be decreased. Due to this length adjustability, the adjustable fitting 16 can be incrementally rotated to adjust the axial length of the adjustable coupling assembly 10.

Additionally, due to the fact that the adjustable fitting 16 includes internal threads 82 that threadingly engage the external threads 28 of the first coupling member 12 and internal threads 92 (oriented in the opposite direction of the internal threads 82) that threadingly engage the external threads 54 of the second coupling member 14, the adjustable fitting 16 permits the first coupling member 12 to be rotated at any desired degree relative to the second coupling member 14. Due to this angular adjustability, the adjustable fitting 16 can be incrementally rotated to orient the first coupling member 12 at a different phase angle than the second coupling member 14, thereby enabling the adjustable coupling assembly 10 to overcome certain misalignment issues.

In an alternative embodiment (not shown), it will be appreciated that the threads of the adjustable coupling assembly 10 can be reversed, yet still provide an adjustable coupling assembly 10 that is capable of permitting adjustment of the rotation angle (i.e., the phase angle) and the length between the two coupling members. For example, the adjustable fitting 16 can be provided with two sets of external threads, instead of internal threads 82, 92, while the first and second coupling members 12, 14 can be provided with internal threads, instead of external threads 28, 54, respectively.

Figure 2:
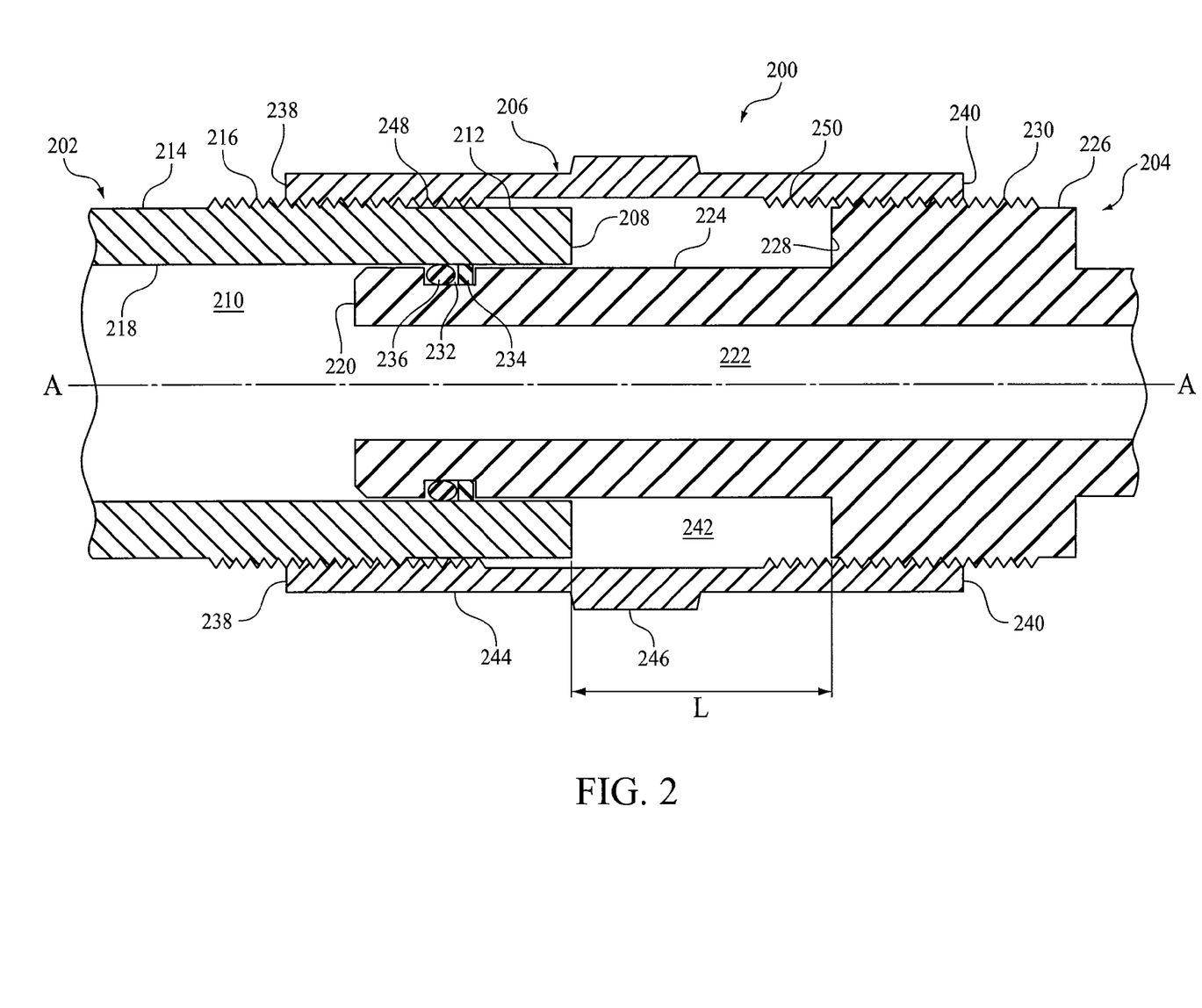
FIG. 2 illustrates a cross-sectional view of a portion of another embodiment of an adjustable coupling assembly 200 in its coupled position.

Illustrated in FIG. 2 is a cross-sectional view of another embodiment of an adjustable coupling assembly 200 shown in the coupled position. The adjustable coupling assembly 200 includes a first coupling member 202, a second coupling member 204, and an adjustable fitting 206 that couples the first and second coupling members 202, 204 together. With respect to each other, the first coupling member 202 generally functions as the "female" coupling member of the adjustable coupling assembly 200 and the second coupling member 204 generally functions as the "male" coupling member of the adjustable coupling assembly 200, such that the first coupling member 202 is configured to receive the second coupling member 204. The adjustable fitting 206 generally functions as a female/female union that is configured to receive both the first and second coupling members 202, 204. Both the first and second coupling members 202, 204 and the adjustable fitting 206 share the same central longitudinal axis A when they are in the coupled position as shown in FIG. 2. In one embodiment, the first and second coupling members 202, 204 and the adjustable fitting 206 can be formed of stainless steel. In alternative embodiments, the first and second coupling members 202, 204 and the adjustable fitting 206 can be formed of other materials, such as brass, aluminum, carbon, steel, and plastic.

In one embodiment, the first coupling member 202 can be a hose adapter that includes a receiving portion having a receiving end 208 and a remote portion (not shown) having a remote end (not shown). Extending through the first coupling member 202 between the receiving end 208 and the remote end is a passageway 210. Although not shown in the drawings, the remote portion of the first coupling member 202 is provided with a series of barbs for connecting to a flexible conduit or hose (not shown). In an alternative embodiment (not shown), the remote portion may be provided with external threads for attachment to a threaded coupling of another component. In another embodiment (not shown), the second coupling member can be an elbow fitting or other types of fittings.

The receiving portion of the first coupling member 202 includes a first exterior cylindrical surface 212 that extends rearward from the receiving end 208 of the first coupling member 202 and a second exterior cylindrical surface 214 that is separated from the first exterior surface 212 by a set of external threads 216 (e.g., right-handed threads). The receiving portion of the first coupling member 202 also includes an interior cylindrical surface 218 that extends rearward from the receiving end 208 of the first coupling member 202.

In one embodiment, the second coupling member 204 can be an elbow fitting that includes a leading portion having a leading end 220 and a trailing portion (not shown) having a trailing end (not shown). Extending through the second coupling member 204 from the leading end 220 to the trailing end is a passageway 222. Although not shown in the drawings, the trailing portion of the second coupling member 204 is provided with a series of barbs for connecting to a flexible conduit or hose (not shown). In an alternative embodiment (not shown), the trailing portion may be provided with external threads for attachment to a threaded coupling of another component. In other embodiments (not shown), the second coupling member can be an elbow fitting or another type of fitting.

The leading portion of the second coupling member 204 includes a first exterior cylindrical surface 224 that extends rearward from the leading end 220 of the second coupling member 204 and a second exterior cylindrical surface 226. The first exterior surface 224 is separated from the first exterior surface 224 by a shoulder 228. As shown in FIG. 2, the second exterior surface 226 has a greater diameter than the first exterior surface 224. The first exterior surface 224 is sized to be received by the interior surface 218 of the first coupling member 202. Provided adjacent to the second exterior surface 226 is a set of external threads 230 oriented in the opposite direction (e.g., left-handed threads) of the external threads 216 of the first coupling member 202. In an alternative embodiment, the second exterior surface 226 can include a set of external right-handed threads, so long as the first coupling member 202 included left-handed threads.

In the illustrated embodiment, the first exterior surface 224 includes an outwardly facing annular groove 232 extending radially inward therefrom. As shown in FIG. 2, the groove 232 is provided adjacent the leading end 220. Positioned within the groove 232 are a support ring 234 constructed of rigid plastic, leather, or hard rubber and an annular seal 236 constructed of neoprene or other suitable sealing material. The annular seal 236 is positioned in the groove 232 between the support ring 234 and the leading end 220 of the second coupling member 204. The annular seal 236 is sized for receipt by and to sealingly engage the interior surface 218 of the first coupling member 202. The support ring 234 is sized for receipt by the interior surface 218 of the first coupling member 202 and serves to protect the annular seal 236 from damage when the adjustable coupling assembly 200 is used in high-pressure applications. In another embodiment (not shown), the support ring 234 may be eliminated when the coupling assembly is used in low-pressure applications. In another alternative embodiment (not shown), the annular seal and the support ring may be received in a groove in the interior surface 218 of the first coupling member 202.

With respect to the adjustable fitting 206, it extends from a first receiving portion having a first receiving end 238 to a second receiving portion having a second receiving end 240 defining a passageway 242 therebetween. The adjustable fitting 206 includes an exterior cylindrical surface 244 and centrally located flats 246 configured to be engaged by a wrench.

In the illustrated embodiment, the adjustable fitting 206 includes a set of internal threads 248 (e.g., right-handed threads) adjacent to the first receiving end 238. The set of internal threads 248 is sized and configured to mesh with and engage the external threads 216 of the first coupling member 202. When coupled together, the first coupling member 202 and the adjustable fitting 206 can be moved, both rotationally and axially, relative to each other due to the threaded relationship between them.

Provided adjacent to the second receiving end 240 is a set of internal threads 250 that are sized and configured to mesh with and engage the external threads 230 of the second coupling member 204. The internal threads 250 are oriented in the opposite direction (e.g., left-handed threads) of the external threads 248 adjustable fitting 206. When coupled together, the second coupling member 204 and the adjustable fitting 206 can be moved, both rotationally and axially, relative to each other due to the threaded relationship between them.

Due to the fact that the adjustable fitting 206 includes internal threads 248 that threadingly engage the external threads 216 of the first coupling member 202 and internal threads 250 (oriented in the opposite direction of the internal threads 248) that threadingly engage the external threads 230 of the second coupling member 204, the adjustable fitting 206 is capable of adjusting the axial length L between the first and second coupling members 202, 204. For example, when the adjustable fitting 206 is rotated in one rotational direction (e.g., clockwise), the axial length L between the first and second coupling members 202, 204 can be increased. On the other hand, when the adjustable fitting 206 is rotated in the other rotational direction (e.g., counter-clockwise), the axial length L between the first and second coupling members 202, 204 can be decreased. Due to this length adjustability, the adjustable fitting 206 can be incrementally rotated to adjust the axial length of the adjustable coupling assembly 200. Axial travel of the first coupling member 202 is limited in the direction towards the second coupling member 204 by the shoulder 228 on the second coupling member 204, as it will interfere with receiving end 208 of the first coupling member 202.

Additionally, due to the fact that the adjustable fitting 206 includes internal threads 248 that threadingly engage the external threads 216 of the first coupling member 202 and internal threads 250 (oriented in the opposite direction of the internal threads 248) that threadingly engage the external threads 230 of the second coupling member 204, the adjustable fitting 206 permits the first coupling member 202 to be rotated at any desired degree relative to the second coupling member 204. Due to this angular adjustability, the adjustable fitting 206 can be incrementally rotated to orient the first coupling member 202 at a different phase angle than the second coupling member 204, thereby enabling the adjustable coupling assembly 200 to overcome certain misalignment issues.

Figure 3:
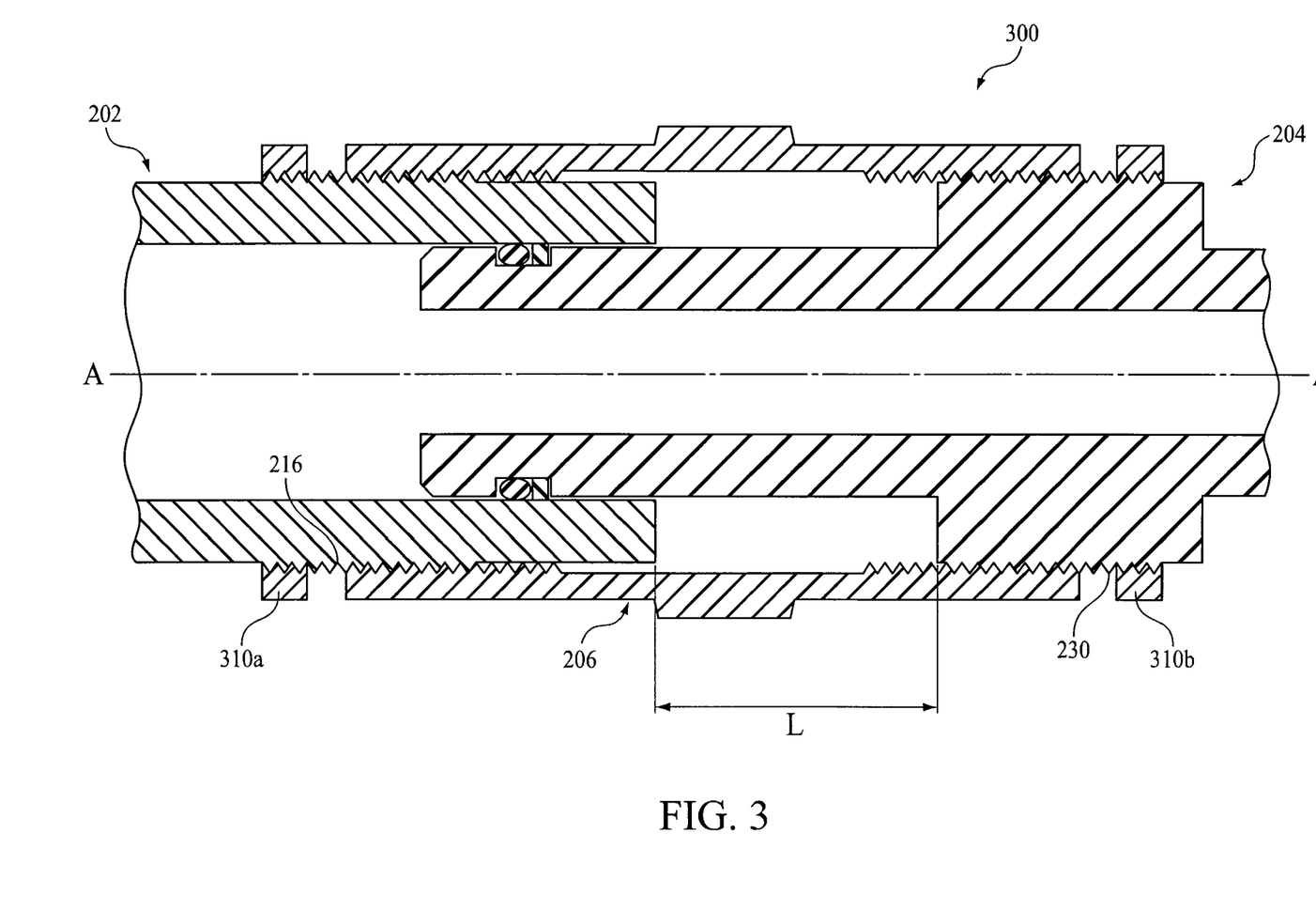
FIG. 3 illustrates a cross-sectional view of a portion of another embodiment of an adjustable coupling assembly 300 in its coupled position.

Illustrated in FIG. 3 is a cross-sectional view of another embodiment of a coupling assembly 300 shown in the coupled position. The coupling assembly 300 is substantially similar to the adjustable coupling assembly 200 described above and illustrated in FIG. 2, with the exception that the coupling assembly 300 includes two jam nuts 310a,b. One jam nut 310a is threadingly engaged to the set of external threads 216 of the first coupling member 202, while the other jam nut 310b is threadingly engaged to the set of external threads 230. The jam nuts 310a,b can be used to prevent unwanted rotation of the first and second coupling members 202, 204 relative to each other after installation. The jam nuts 310a, 310b can also prevent unwanted rotation of the adjustable fitting 206.

There are several potential benefits of the adjustable coupling assemblies 10, 200, 300 described above and illustrated in the figures. First, these adjustable coupling assemblies 10, 200, 300 permit the end user to adjust the first and/or second coupling member phase angles of the hose assembly to accommodate any misalignment of components when used with hose assemblies, such as double elbow hose assemblies. Second, these adjustable coupling assemblies 10, 200, 300 permit the end user to adjust the length of the coupling assemblies. These potential benefits should be helpful in the aftermarket where hoses are replaced frequently.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or multiple components.

While the present application illustrates various embodiments, and while these embodiments have been described in some detail, it is not the intention of the applicant to restrict or in any way limit the scope of the claimed invention to such detail. Additional advantages and modifications will readily appear to those skilled in the art. Therefore, the invention, in its broader aspects, is not limited to the specific details and illustrative examples shown and described. Accordingly, departures may be made from such details without departing from the spirit or scope of the applicant's claimed invention. Moreover, the foregoing embodiments are illustrative, and no single feature or element is essential to all possible combinations that may be claimed in this or a later application.

What is claimed is:

1. A coupling assembly comprising:
    a union member including a first receiving portion having internal left-handed threads and a second receiving portion having internal right-handed threads;
    a first coupling member having external left-handed threads that are threadingly engaged to the internal left-handed threads of the union member;
    a second coupling member having external right-handed threads that are threadingly engaged to the internal right-handed threads of the union member; and
    at least two annular seals, one of which is provided between the union member and the first coupling member and the other provided between the union member and the second coupling member;
    a first retaining element provided between the first coupling member and the union member for limiting axial movement of the first coupling member in a direction away from the second coupling member; and
    a second retaining element provided between the second coupling member and the union member for limiting axial movement of the second coupling member in a direction away from the first coupling member,
    wherein at least one of the first and second retaining elements is selected from the group consisting of a split, retaining ring seated in a groove in the union member, a radially inward protruding rib extending from an interior surface of the union member, and radially inward protruding bumps extending from an interior surface of the union member, and
    wherein, upon rotation of the union member, the length between the first and second coupling members changes.

2. The coupling assembly of claim 1, wherein at least one of the first and second retaining elements includes a radially inward protruding rib formed via a secondary forming operation.

3. The coupling assembly of claim 1, wherein at least one of the first and second retaining elements includes radially inward protruding bumps formed via a secondary forming operation.

4. The coupling assembly of claim 1, wherein the first coupling member is a hose adapter.

5. The coupling assembly of claim 1, wherein the second coupling member is an elbow fitting.

6. A coupling assembly comprising:
    an adjustable fitting including a first receiving portion having a set of internal left-handed threads and a second receiving portion having a set of internal right-handed threads;
    an elbow fitting including a leading portion having external threads that are threadingly engaged to the internal left-handed threads of the adjustable fitting;
    a hose adapter including a leading portion having external threads that are threadingly engaged to the internal right-handed threads of the adjustable fitting,
        wherein, upon rotation of the adjustable fitting, the length or phase angle between the elbow fitting and the hose adapter changes;
    a first retaining element provided between the elbow fitting and the adjustable fitting for limiting axial movement of the first elbow fitting in a direction away from the hose adapter; and
    a second retaining element provided between the hose adapter and the adjustable fitting for limiting axial movement of the hose adapter in a direction away from the elbow fitting,
        wherein at least one of the first and second retaining elements includes a split, retaining ring seated in a groove in the adjustable fitting.

7. The coupling assembly of claim 6, further comprising an annular seal provided between the elbow fitting and the adjustable fitting.

8. The coupling assembly of claim 7, further comprising another annular seal provided between the hose adapter and the adjustable fitting.

9. The coupling assembly of claim 6, wherein at least one of the first and second retaining elements includes a radially inward protruding rib extending from an interior surface of the adjustable fitting.

10. The coupling assembly of claim 9, wherein the radially inward protruding rib is formed via a secondary forming operation.

11. The coupling assembly of claim 9, wherein the adjustable fitting is a straight fitting.

12. A coupling assembly comprising:
    an adjustable fitting including a first set of internal threads adjacent to one of its ends and a second set of internal threads adjacent to its other end, the first set of internal threads being oriented in an opposite direction as the second set of internal threads;
    a first coupling member including a leading portion having external threads threadingly engaged to the first set of internal threads of the adjustable fitting;
    a second coupling member including a receiving portion sized to receive at least a portion of the first coupling member, the second coupling member having external threads threadingly engaged to the second set of internal threads of the adjustable fitting; and
    an annular seal provided between the first and second coupling members when the first coupling member is fully inserted into the second coupling member,
    wherein, upon rotation of the adjustable fitting, the length between the first and second coupling members changes.

13. The coupling assembly of claim 12, further comprising a first jam nut threadingly engaged to the external threads of the first coupling member and a second jam nut threadingly engaged to the external threads of the second coupling member.

14. The coupling assembly of claim 12, wherein the first coupling member is a hose adapter.

15. The coupling assembly of claim 12, wherein the second coupling member is an elbow fitting.

16. The coupling assembly of claim 12, wherein the first set of internal threads of the adjustable fitting are right-handed threads and the second set of internal threads of the adjustable fitting are left-handed threads.

17. The coupling assembly of claim 12, wherein the first set of internal threads of the adjustable fitting are left-handed threads and the second set of internal threads of the adjustable fitting are right-handed threads.

18. The coupling assembly of claim 12, further comprising:

a first retaining element provided between the first coupling member and the union member for limiting axial movement of the first coupling member in a direction away from the second coupling member; and     a second retaining element provided between the second coupling member and the union member for limiting axial movement of the second coupling member in a direction away from the first coupling member, wherein at least one of the first and second retaining elements is selected from the group consisting of a split, retaining ring seated in a groove in the union member, a radially inward protruding rib extending from an interior surface of the union member, and radially inward protruding bumps extending from an interior surface of the union member.

* * * * *